United States Patent
Li et al.

(10) Patent No.: US 8,655,068 B1
(45) Date of Patent: Feb. 18, 2014

(54) COLOR CORRECTION SYSTEM

(71) Applicants: Qi Li, New Providence, NJ (US); Xuling Luo, Freehold, NJ (US)

(72) Inventors: Qi Li, New Providence, NJ (US); Xuling Luo, Freehold, NJ (US)

(73) Assignee: Li Creative Technologies, Inc., Florham Park, NJ (US)

( * ) Notice: Subject to any disclaimer, the term of this patent is extended or adjusted under 35 U.S.C. 154(b) by 0 days.

(21) Appl. No.: 13/645,856

(22) Filed: Oct. 5, 2012

Related U.S. Application Data

(60) Provisional application No. 61/626,990, filed on Oct. 7, 2011.

(51) Int. Cl.
*G06K 9/00* (2006.01)

(52) U.S. Cl.
USPC ............ 382/167; 382/162; 382/274; 382/128

(58) Field of Classification Search
USPC .......... 382/162, 167, 168, 274; 358/518, 520, 358/522, 523; 348/453; 345/589, 597, 601, 345/604, 605
See application file for complete search history.

(56) References Cited

U.S. PATENT DOCUMENTS

| | | | |
|---|---|---|---|
| 5,852,675 A | 12/1998 | Matsuo et al. | |
| 6,058,208 A | 5/2000 | Ikeda et al. | |
| 7,227,571 B2 | 6/2007 | Katoh | |
| 7,633,555 B2 | 12/2009 | Yang et al. | |
| 7,756,328 B2 * | 7/2010 | Komiya et al. | 382/164 |
| 8,467,104 B2 * | 6/2013 | Katayama | 358/3.23 |
| 2005/0024657 A1 * | 2/2005 | Ota et al. | 358/1.9 |
| 2005/0024658 A1 * | 2/2005 | Ota et al. | 358/1.9 |
| 2009/0002517 A1 | 1/2009 | Yokomitsu et al. | |

OTHER PUBLICATIONS

BR Med-Connect Update. Apr. 23, 2011. General Devices. http://www.general-devices.com/br-med-connect-update.
Steve Hullfish, The Art and Technique of Digital Color Correction. Amsterdam: Focal Press, 2008.
E. Reinhard, E. A. Khan, A. O. Akyuz and G. M. Johnson, Color Imaging: Fundamentals and Applications. Wellesley, MA: A K Peters, 2008.
http://www.qpcard.se/BizPart.aspx?tabId=31&catId=1&tci=100&prod=3&tci=102.
http://www.ti.com/tool/tmdxevm8168.
http://www.nbc33tv.com/news/medical-breakthrough-ambulance-cameras.
http://www.spytechs.com/Car-Cameras/ambulance-camera.htm.
http://www.general-devices.com/e-bridge.
http://www.alliedvisiontec.com.

* cited by examiner

*Primary Examiner* — Ali Bayat
(74) *Attorney, Agent, or Firm* — Ash Tankha; Lipton, Weinberger & Husick

(57) ABSTRACT

A color correction system includes an identical first color chart (FCC) and a second color chart (SCC), and a color correction unit (CCU). The FCC and the subject are positioned in view of a source image capture device (SICD) at a source location. The SCC and a display unit are positioned in view of a destination image capture device (DICD) at the destination location. The SICD captures and transmits source image content (SIC) of the subject and the FCC to the CCU at the destination location via a network. The DICD captures destination image content (DIC) of the SCC and the SIC displayed on the display unit. The CCU generates calibration parameters by comparing the FCC extracted from the SIC and/or the DIC, with the SCC extracted from the DIC, and corrects the SIC of the subject and gamma parameters on the display unit using the generated calibration parameters.

25 Claims, 7 Drawing Sheets

COLOR CORRECTION SYSTEM

CROSS REFERENCE TO RELATED APPLICATIONS

This application claims the benefit of provisional patent application No. 61/626,990 titled "Method and apparatus for automatic color correction in video applications", filed on Oct. 7, 2011 in the United States Patent and Trademark Office.

The specification of the above referenced patent application is incorporated herein by reference in its entirety.

BACKGROUND

A conventional emergency medical service (EMS) system comprises, for example, a color video camera, a video decoding and compression device, a wireless transmitter, a wireless receiver, a video decompression and coding device, and a video monitor. More than in other public safety applications, it is imperative that video used for emergency medical service (EMS) applications retains color truth throughout the EMS system, for example, during recording of the video, transfer of the video, and display of the video. This is because any impairment of color information during the recording, the transferring, and/or display of the video can be life threatening as the color of, for example, blood, skin, etc., of a patient is often used to make critical diagnoses. Currently, transmission of the video over a network, for example, a mobile communication network, results in color distortion of the video due to presence of multiple distortion factors, for example, ineffective data compression algorithms, communication channels, inadequate display monitors, lighting conditions, etc., that cause impairments in the video. The distortion factors distort the color information in the video, which is critical to EMS applications. Hence, there is a need for a method and a system that correct color of an image of a patient while considering all the distortion factors that affect the color of the image of the patient.

Color correction of images has been studied for decades and efforts have been made for correcting colors of an image. For example, one of the conventional techniques for correcting color of an image involves capturing a photographic image of a color card that is positioned in a field of view of a camera. The captured photo image is then transferred to a computer. A user then needs to manually select and highlight the color card inside the photo image and run software to correct the color of the photo image. However, this technique allows color correction of only a single photo image and is ineffective for processing video in real time. Moreover, this technique does not include a display unit in the system and hence cannot automatically adjust gamma parameters on the display unit. The technique can only process a photo image and save the processed photo image for printing and thus cannot ensure that the displayed color of the processed photo image is the true color of the photo image. Hence, there is a need for a method and a system that correct color of images in real world video applications.

Another conventional technique performs color correction by attaching a color chart to a patient's skin and generating a color correction curve from the colors on the color chart. Another conventional technique performs color correction by registering a standard point and an object point on color spaces, and determining a mapping function for the conversion of the color spaces. Another conventional technique performs color correction by adjusting chromatic values in an active region of an image by defining an operation window and a target window. Another conventional technique performs color reproduction using a correction matrix for white balance and a transformation matrix for a light source, where the correction matrices are generated from an image input apparatus. Another conventional technique performs color correction by picking up specific source regions on source images using two cameras. The colors of the source regions are then used to decide the color set and correct the colors in similar ranges to the reference colors. A disadvantage of these conventional techniques used for color correction is the need for an interactive means to specify the source color and the target color. A second disadvantage is that the target reference color is typically chosen subjectively, which leads to randomness of the color correction result. Moreover, these conventional techniques compensate for the color distortion caused due to only lighting conditions.

Hence, there is a long felt but unresolved need for a method and a system that corrects color of an image impaired due to multiple distortion factors in real time applications.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above mentioned need for correcting color of an image impaired due to multiple distortion factors, for example, ineffective data compression algorithms, communication channels, inadequate display monitors, lighting conditions, etc. The method and the system disclosed herein perform color correction in real time applications, for example, in emergency medical service (EMS) systems, television broadcasting, product inspection, telemedicine, medical education, remote learning, video conferencing, video gaming, thermal imaging, etc.

The method and the system disclosed herein provide a color correction system for correcting color of an image of a subject. As used herein, the term "subject" refers, for example, to a person such as a human patient, an animal, etc., whose image is required to be captured for making a diagnosis based on color of the subject's blood, skin, etc. The color correction system comprises a first color chart, a second color chart, and a color correction unit. The first color chart is positioned proximal to the subject. The first color chart and the subject are positioned in a field of view of a source image capture device at a source location, for example, inside an ambulance, an operating room, a classroom for remote education, etc. As used herein, the term "source image capture device" refers, for example, to a still camera, a video camera, etc., that captures and records images such as still images, moving images, etc., at a source location. The second color chart is identical to the first color chart and positioned proximal to a display unit. The second color chart and the display unit are positioned in a field of view of a destination image capture device at a destination location, for example, at an emergency medical service (EMS) department of a hospital, a teaching classroom, etc. As used herein, the term "destination image capture device" refers, for example, to a still camera, a video camera, etc., that captures and records images such as still images, moving images, etc., at a destination location. Each corner of the first color chart and the second color chart is configured to have one or more of a predetermined shape, color, pattern, a lighting element, etc. The color correction unit is operably connected to the display unit and the destination image capture device at the destination location. The color correction unit is configured to operate in an automatic mode, a manual mode, and a semi-manual mode. The color correction unit comprises at least one processor communicatively coupled to a non-transitory computer readable storage medium configured to store instructions executable by the processor, where the instructions are configured to correct the color of the image of the subject on the display unit at the destination location.

The source image capture device captures source image content of the subject and the first color chart. The source image capture device is configured to transmit the captured source image content of the subject and the first color chart from the source location to the color correction unit at the destination location via a network. In an embodiment, a transmitter is operably connected to the source image capture device at the source location. The transmitter is configured to transmit the captured source image content of the subject and the first color chart from the source location to a receiver at the destination location via the network. The receiver is operably connected to the color correction unit and receives the captured source image content of the subject and the first color chart from the transmitter via the network. The color correction unit is configured to send the captured source image content of the subject and the first color chart received from the source image capture device via the network, to the display unit at the destination location. The display unit displays the received source image content of the subject and the first color chart on the display unit at the destination location. The destination image capture device captures destination image content of the second color chart and the displayed source image content of the subject and the first color chart.

In an embodiment, the color correction unit buffers the received source image content and converts a format of the buffered source image content into a predefined color image format. Furthermore, the color correction unit buffers the captured destination image content and converts a format of the buffered destination image content into a predefined color image format. The color correction unit segments the received source image content and/or the captured destination image content for extracting the first color chart from the received source image content and/or the captured destination image content. The color correction unit identifies characteristics of the first color chart from the received source image content and/or the captured destination image content for extracting the first color chart. For example, the color correction unit searches for corners of the first color chart from the received source image content and/or the captured destination image content for extracting the first color chart. Furthermore, the color correction unit segments the captured destination image content for extracting the second color chart from the captured destination image content. The color correction unit identifies characteristics of the second color chart from the captured destination image content. For example, the color correction unit searches for the corners of the second color chart from the captured destination image content for extracting the second color chart.

The color correction unit generates calibration parameters by comparing the first color chart extracted from the received source image content and/or the captured destination image content, with the second color chart extracted from the captured destination image content. The color correction unit recognizes and extracts the first color chart from the captured destination image content or from the combination of the received source image content and the captured destination image content. The color correction unit recognizes and extracts the second color chart from the captured destination image content. The color correction unit rotates and scales the extracted first color chart and the extracted second color chart, to allow the extracted first color chart and the extracted second color chart to be compared. The color correction unit is configured to rotate and scale the extracted first color chart and the extracted second color chart for aligning the extracted first color chart and the extracted second color chart to perform a pixel to pixel comparison of the extracted first color chart and the extracted second color chart. The color correction unit compares color values of corresponding pixels on the rotated and scaled first color chart and the rotated and scaled second color chart to determine differences in the color values. The differences in the color values of the corresponding pixels on the rotated and scaled first color chart and the rotated and scaled second color chart identify a color distortion of the received source image content of the first color chart displayed on the display unit. The color distortion of the first color chart can therefore be determined by comparing the first color chart extracted from either the destination image content or a combination of the destination image content and the source image content, with the second color chart extracted from the destination image content. The color correction unit converts the determined differences in the color values of the corresponding pixels on the rotated and scaled first color chart and the rotated and scaled second color chart to calibration parameters.

The color correction unit corrects the color distortion of the received source image content of the subject displayed on the display unit at the destination location using the generated calibration parameters to correct the color of the image of the subject on the display unit at the destination location. The color correction unit corrects the color distortion of the first color chart by making the displayed first color chart the same as the second color chart extracted from the destination image content by adjusting the calibration parameters. The display unit then displays the corrected source image content with the correct colors.

In an embodiment, the color correction unit performs a gamma correction of the received source image content of the subject on the display unit using the generated calibration parameters. In another embodiment, the color correction unit comprises a graphical user interface and/or one or more interface elements configured to acquire inputs from a user in a manual mode for one or more of highlighting the first color chart extracted from the received source image content and/or the captured destination image content, and/or the second color chart extracted from the captured destination image content, adjusting the generated calibration parameters to correct the color distortion of the received source image content of the subject displayed on the display unit at the destination location, etc. As used herein, the term "interface elements" refers to any software or hardware implemented switches, for example, push buttons, touch pads, physical keys, sliding buttons, knobs, etc., capable of receiving an input from a user. The color correction unit is configured to correct the received source image content of the subject displayed on the display unit at the destination location using the acquired inputs. In an embodiment, the color correction unit converts a format of the corrected source image content of the subject with the corrected color distortion into a predefined display format for display on the display unit.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Figure 1:
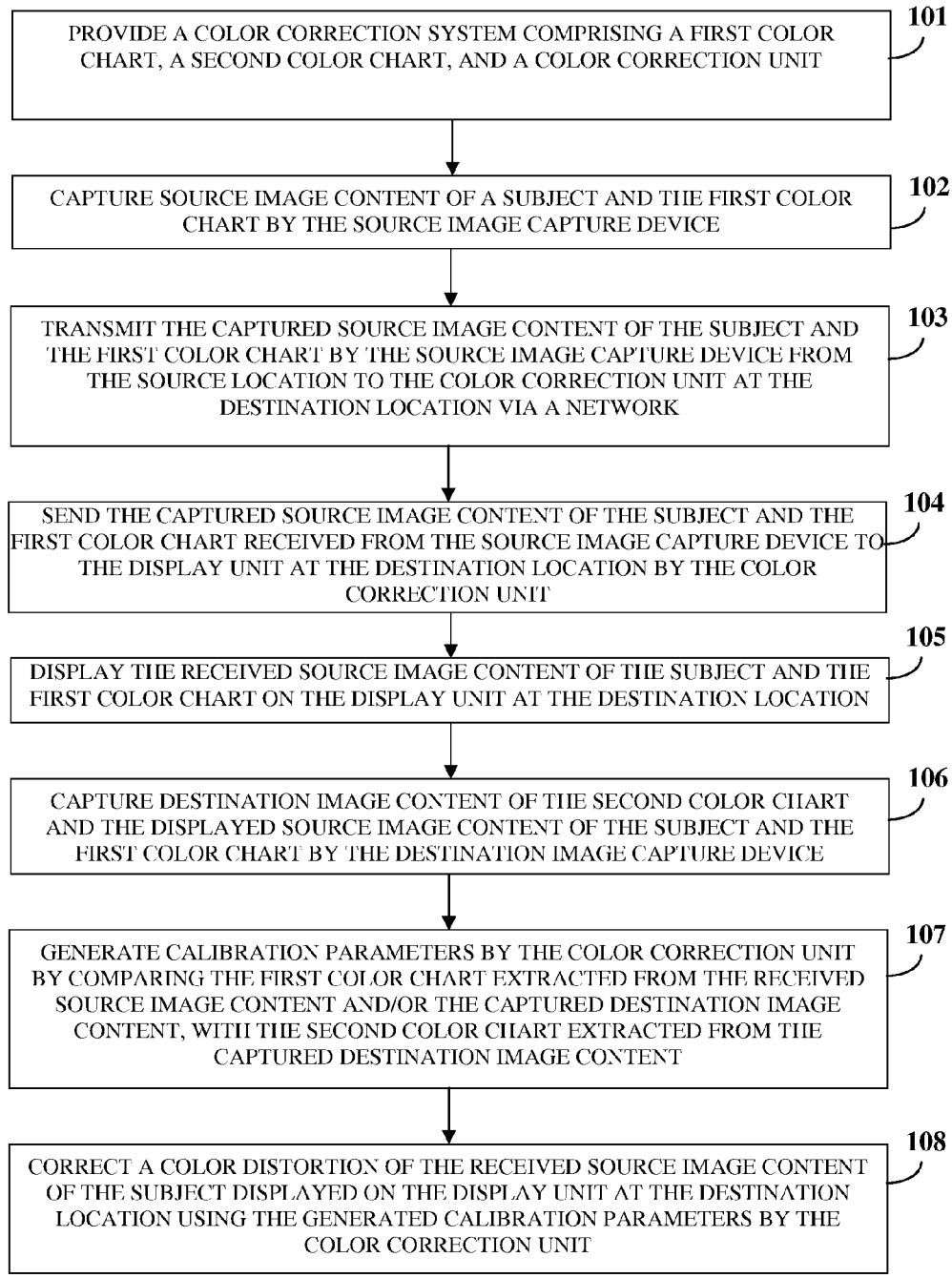
FIG. 1 illustrates a method for correcting color of an image of a subject.

FIG. 1 illustrates a method for correcting color of an image of a subject. As used herein, the term "color correction" refers to a process for altering the color of light of an image. The image of the subject is a two dimensional artifact that has a substantially similar appearance to the subject. The image is, for example, a still image such as a photograph, a moving image such as a video, etc. As used herein, the term "subject" refers, for example, to a person such a human patient, an animal, etc., whose image is required to be captured for making a diagnosis based on color of the subject's blood, skin, etc. The method disclosed herein provides 101 a color correction system comprising a first color chart, a second color chart, and a color correction unit. The term "color chart" refers to a physical graphic representation of standardized color samples used, for example, for performing color comparisons and measurements such as checking color reproduction of an imaging system, for calibration of image capture devices, for checking color temperature of lighting, etc. The first color chart is positioned proximal to the subject. The first color chart and the subject are positioned in a field of view of a source image capture device at a source location. The field of view of an image capture device refers to the extent of a scene that can be imaged by the image capture device. The source image capture device is, for example, a still camera, a video camera, etc., that captures and records images such as still images, moving images, etc., at a source location. As used herein, the term "source location" refers to a site or a location from where a required image is captured and subsequently transmitted for image reproduction at another location. For example, the source location is an out-of-hospital medical care facility and/or transport to definitive care where emergency medical services (EMS) are provided to patients with major or serious illnesses and injuries. Other examples of the source location comprise an ambulance en route to a hospital, an operating room, a classroom for remote education, etc.

The second color chart is identical to the first color chart and positioned proximal to a display unit. For example, the second color chart is positioned and affixed on a frame of the display unit. The frame of the display unit is, for example, a support structure positioned along the periphery of the display unit. The second color chart and the display unit are positioned in a field of view of a destination image capture device at a destination location. As used herein, the term "destination location" refers to a site or a location to which an image captured is subsequently transmitted for image reproduction. The destination location is distant from the source location. For example, the destination location is the site or the location that provides definitive care to patients. The destination location is, for example, a hospital emergency room, a doctor's examination room, an emergency medical service (EMS) department of a hospital, a teaching classroom, etc. The destination image capture device is, for example, a still camera, a video camera, etc., that captures and records images such as still images, moving images, etc., at a destination location.

The first color chart and the second color chart are herein collectively referred to as "color charts". The color charts are designed by taking into consideration colors associated with human features, for example, skin, blood, etc. The colors in the color charts are defined and selected close to or related to the colors of the subject of interest or locations. For example, in an emergency medical service (EMS) application and a medical teaching application, the color correction unit defines and selects colors in the color charts to be close to the colors of human skin, internal organs, and blood to achieve optimal performance. The color charts are configured for enhanced recognition by the color correction unit. Each corner of the first color chart and the second color chart is configured to have one or more of a predetermined shape, color, pattern, a lighting element, etc. For example, the shape of each color chart is asymmetric for enhanced recognition by the color correction unit when the color charts are upside down. In another example, color lights are positioned on the corners of the first color chart and the second color chart for enhanced image capture by the source image capture device and the destination image capture device respectively. In an embodiment, the color charts are printed on paper with a fastening medium provided on a rear surface of each of the color charts for ease of use. The fastening medium is, for example, an adhesive, a magnetic surface, a clip, etc. The color correction unit is operably connected to the display unit and the destination image capture device at the destination location as exemplarily illustrated in FIG. 3.

At the source location, the source image capture device captures 102 source image content of the subject and the first color chart. As used herein, the term "source image content" refers to an image of the subject and an image of the first color chart as captured by the source image capture device. For example, in an ambulance application, the source image content comprises an image of a human subject's face and an image of the first color chart. The source image capture device is configured to transmit 103 the captured source image content of the subject and the first color chart from the source location to the color correction unit at the destination location via a network. The network is, for example, the internet, a local area network, a wide area network, a wired network, a wireless network, an infrared communication network, a communication network that implements Wi-Fi® of the Wireless Ethernet Compatibility Alliance, Inc., a cellular network, a mobile communication network, etc., and any combination thereof. The mobile communication network is, for example, a global system for mobile (GSM) communications network, a general packet radio service (GPRS) network, a code division multiple access (CDMA) network, a third generation (3G) mobile communication network, a fourth generation (4G) mobile communication network, etc. In an embodiment, a transmitter is operably connected to the source image capture device at the source location. The transmitter is configured to transmit the captured source image content of the subject and the first color chart from the source location to a receiver at the destination location via the network. The receiver is operably connected to the color correction unit. The receiver receives the captured source image content of the subject and the first color chart from the transmitter via the network.

The color correction unit is configured to send 104 the captured source image content of the subject and the first color chart received from the source image capture device via the network to the display unit at the destination location. The display unit displays 105 the received source image content of the subject and the first color chart at the destination location. The displayed color of the subject's image is typically adversely affected by multiple distortion factors along the communication channel resulting in color distortion of the image. As used herein, the term "communication channel" refers to a medium through which the captured image of the subject is transmitted to the display unit in the destination location from the source location. The distortion factors that cause color distortions of the image comprise, for example, lighting conditions at the source location, settings of the source image capture device, coding, video compression, compression algorithms used, computational noise, noise added by the network, communication channel noise, setting, model, aging, etc., of the display unit, lighting conditions at the destination location, etc. The color correction unit corrects and compensates for any color distortion of the image occurring in the entire communication channel from reception of the captured source image content to the display of the received source image content.

The destination image capture device captures 106 the destination image content of the second color chart and the displayed source image content of the subject and the first color chart. The destination image content comprises an image of the display unit which displays the source image content and the second color chart attached to the frame of the display unit. In an embodiment, the color correction unit buffers the received source image content and converts a format of the buffered source image content into a predefined color image format, for example, an internal red, green, and blue (RGB) color format. Furthermore, the color correction unit buffers the captured destination image content and converts a format of the buffered destination image content into a predefined color image format, for example, an internal red, green, and blue (RGB) color format.

The color correction unit segments the received source image content and/or the captured destination image content for extracting the first color chart from the received source image content and/or the captured destination image content. The color correction unit identifies characteristics of the first color chart from the captured destination image content for extracting the first color chart. In an embodiment, the color correction unit identifies characteristics of the first color chart from the received source image content, or from both the received source image content and the captured destination image content, if needed, for extracting the first color chart. For example, the color correction unit searches for corners of the first color chart from the received source image content and/or the captured destination image content for extracting the first color chart. Furthermore, the color correction unit segments the captured destination image content for extracting the second color chart from the captured destination image content. The color correction unit identifies characteristics of the second color chart from the captured destination image content. For example, the color correction unit searches for corners of the second color chart from the captured destination image content for extracting the second color chart. In most cases, the color correction unit recognizes and extracts both the first color chart and the second color chart from the captured destination image content for comparison. If the captured source image content is of low quality, the color correction unit uses both the source image content and the destination image content to identify the first color chart.

Figure 2:
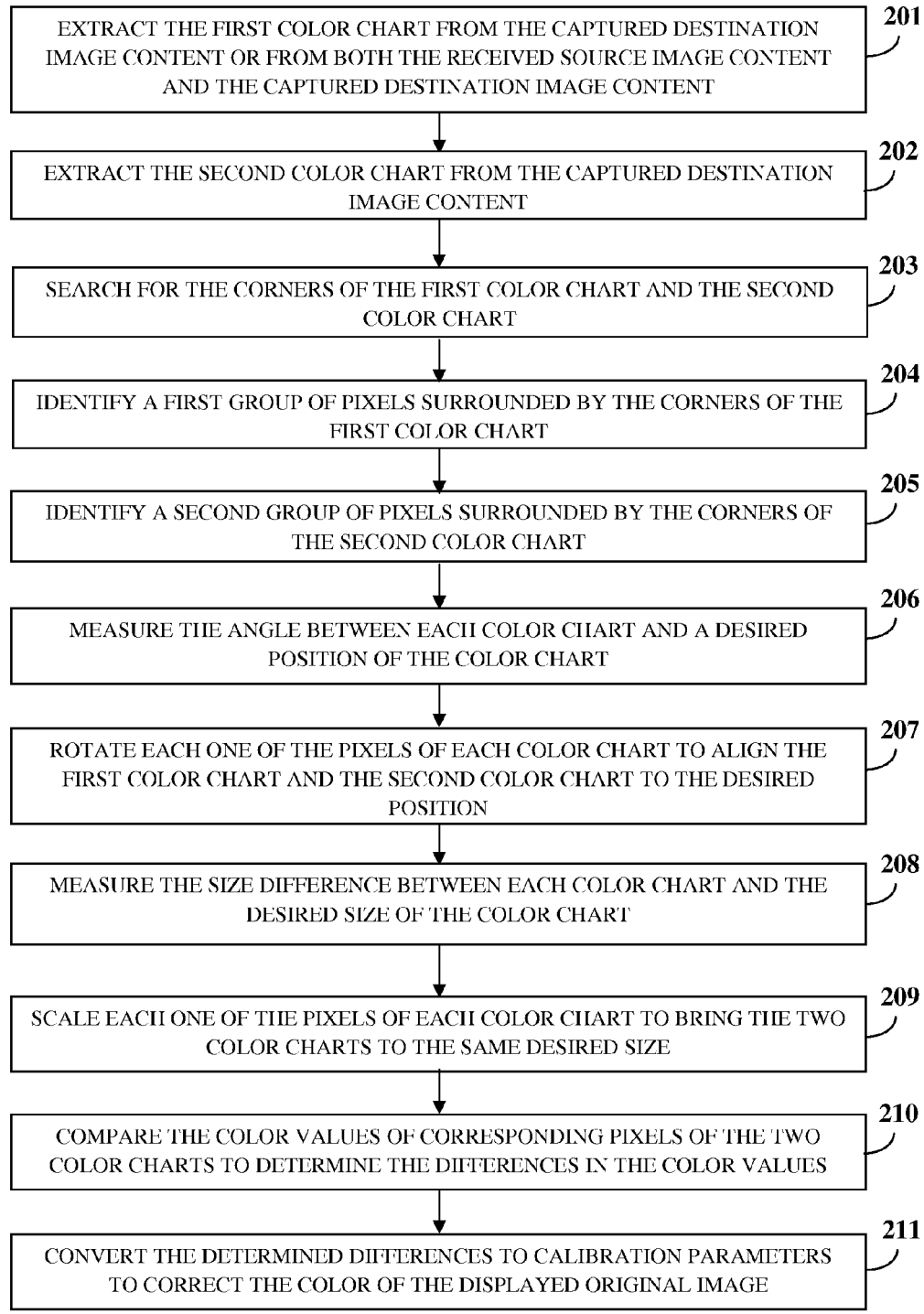
FIG. 2 exemplarily illustrates a method for generating calibration parameters used to correct a color distortion of the source image content of a subject displayed on a display unit at a destination location.

The color correction unit generates 107 calibration parameters by comparing the first color chart extracted from the received source image content and/or the captured destination image content, with the second color chart extracted from the captured destination image content as disclosed in the detailed description of FIG. 2. The color correction unit recognizes and extracts the first color chart from the captured destination image content, or from the combination of the received source image content and the captured destination image content. The color correction unit recognizes and extracts the second color chart from the captured destination image content. The color correction unit rotates and scales the extracted first color chart and the extracted second color chart, to allow the extracted first color chart and the extracted second color chart to be compared. The color correction unit is configured to rotate and scale the extracted first color chart and the extracted second color chart for aligning the extracted first color chart and the extracted second color chart to perform a pixel to pixel comparison of the extracted first color chart and the extracted second color chart. The color correction unit compares color values of corresponding pixels on the rotated and scaled first color chart and the rotated and scaled second color chart to determine differences in the color values. The differences in the color values of the corresponding pixels on the rotated and scaled first color chart and the rotated and scaled second color chart identify the color distortion of the received source image content of the first color chart displayed on the display unit. The color correction unit converts the determined differences in the color values of the corresponding pixels on the rotated and scaled first color chart and the rotated and scaled second color chart to the calibration parameters.

The color distortion of the first color chart, as captured by the destination image capture device, represents distortions caused, for example, by lighting conditions at the source location, settings of the source image capture device, coding, video compression, compression algorithms used, computational noise, noise added by the network, the display unit, lighting conditions near the display unit, etc. The color distortion of the second color chart represents distortions caused, for example, by computational noise, noise added by the network, communication channel noise, setting, model, settings of the destination image capture device, lighting conditions at the destination location, etc. The resultant color distortion also referred to as "combined distortion" represents a combination of the color distortion of the first color chart and the color distortion of the second color chart. The color correction unit disclosed herein is configured to correct the color distortion of the first color chart, as captured by the destination image capture device. The color distortion of the second color chart, although existing, may not substantially affect the correction of the color distortion of the first color chart.

Figure 4:
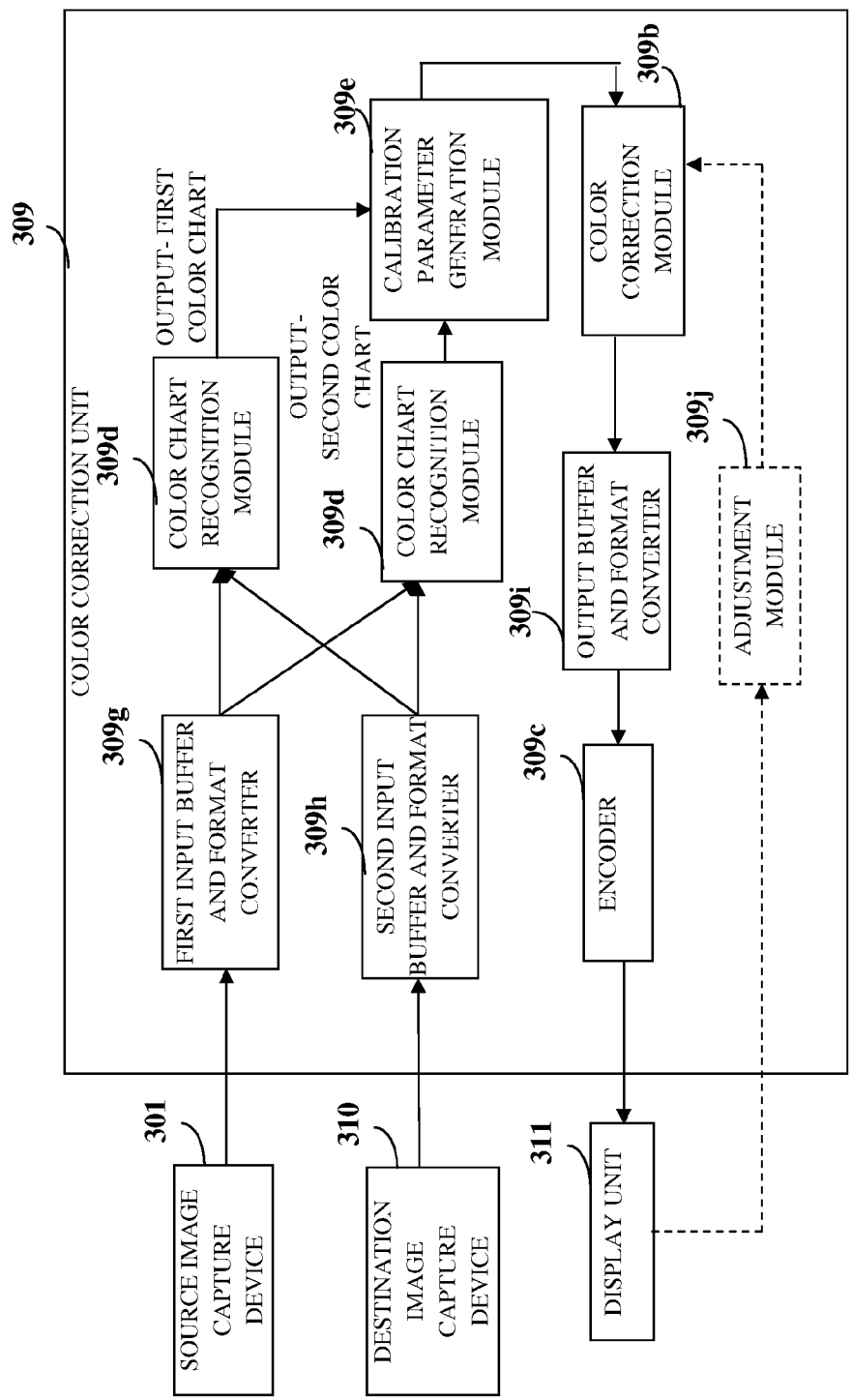
FIG. 4 exemplarily illustrates a block diagram of a color correction unit that communicates with a source image capture device at a source location and a destination image capture device at a destination location.

The color correction unit corrects 108 the color distortion of the received source image content of the subject displayed on the display unit at the destination location using the generated calibration parameters to correct the color of the image of the subject on the display unit at the destination location as disclosed in the detailed description of FIG. 4. In an embodiment, the color correction unit converts a format of the corrected source image content of the subject with the corrected color distortion into a predefined display format for display on the display unit. A user may activate the manual mode of operation to highlight the color charts or adjust color through a graphical user interface (GUI) of the color correction unit, or adjust the brightness and color setting of the display unit directly with vision comparison. As used herein, the term "user" refers to a person located at the destination location who remotely monitors the subject at the source location. For example, the user is a medical practitioner located in an emergency room in a hospital, who monitors a patient in an ambulance through the display unit in the emergency room.

The color correction unit performs color correction, for example, red green blue (RGB), hue, saturation, and value (HSV), hue, saturation, lightness (HSL), etc., correction and gamma correction. Gamma correction refers to a nonlinear operation used to code and decode luminance or tristimulus values in video or still image systems. The tristimulus values of a color refer to the amounts of three primary colors in a tri-chromatic additive color model. Gamma distortion in the displayed image content is part of a combined distortion. The color correction unit is configured to correct the gamma distortion in its calibration. For example, when a user manually adjusts the bright or dark settings of the display unit, the color correction unit estimates different sets of calibration parameters corresponding to these settings and calibrates the received source image content of the subject on the display unit accordingly. The color correction unit performs a gamma correction of the received source image content of the subject on the display unit using the generated calibration parameters.

In an embodiment, the color correction unit performs real time color correction for the image by enclosing the color correction system comprising the first color chart, the second color chart, and the color correction unit in a feedback loop. The color correction system forms a feedback loop from the source image capture device at the source location to the display unit at the destination location.

In an embodiment, the color correction unit performs color correction of the image in an automatic mode of operation. In another embodiment, the color correction unit performs the color correction of the image in a manual mode of operation. In the manual mode of operation, the color correction unit acquires inputs provided by a user using an input device, for example, a computer mouse, a touch screen, a touch pad, a keyboard, a light pen, etc., via a graphical user interface (GUI) of the color correction unit, or using interface elements provided on the color correction unit. As used herein, the term "interface elements" refers to any software or hardware implemented switches, for example, push buttons, touch pads, physical keys, sliding buttons, knobs, etc., capable of receiving an input from a user. The manual mode of operation acts as a backup mode. The user can manually point out to a location on the color charts using an input device or an interface element, calibrate the display unit, and display patient images in true color on the display unit. In another embodiment, the color correction unit performs the color correction of the image in a semi-manual mode of operation.

Consider an example of color correction performed by the color correction unit. The image of the first color chart captured by the source image capture device at the source location is represented as C1. Prior to color correction of the captured image of the first color chart, C1 is displayed as f(C1) on the display unit at the destination location, where function f(.) represents a color distortion function caused, for example, by the source image capture device, a video compression algorithm implemented by a video compressor, the network, a decoder, lighting conditions at the source location, settings of the display unit, etc. A color distortion function caused in the image of the second color chart captured by the destination image capture device at the destination location is represented as g (.). The second color chart and f(C1) captured by the destination image capture device are represented as g(C2) and g(f(C1)) respectively. The function g(f(C1)) includes the distortion caused by lighting conditions at the destination location.

Without feedback, color distortion "d" in the view of the destination image capture device is as follows:

$$d=g(C2)-g\{f1(C1)\}$$

With feedback as implemented in the method disclosed herein, the color correction unit computes a function f2 such that:

$$g(C2)=g\{f2[f1(C1)]\}, \text{thus}$$

$$C2=f2[f1(C1)]=C1, \text{then}$$

$$d=g(C2)-g\{f2[f1(C1)]\}=g(C2)-g(C1)=0.$$

The equation $d=g(C2)-g(C1)=0$ represents stable color correction as $g(C2)=g(C1)$. The color correction unit corrects the color of the image by making C2 equal to C1 through the automatic feedback loop for color correction implemented in the method disclosed herein. "f2" in the above equations refers to an inverse function of the combined or resultant color distortion function. The resultant color distortion function is a function representing the combined distortion caused, for example, by lighting conditions at the source location, settings of the source image capture device, coding, video compression, compression algorithms used, computational noise, noise added by the network, communication channel noise, setting, model, aging, etc., of the display unit, settings of the destination image capture device, lighting conditions at the destination location, etc. In an embodiment, the color correction unit uses a polynomial fitting model or any other non-linear function to represent f2. The polynomial fitting model uses a polynomial curve to fit the nonlinear data points, such as $f2(x)=ax^n+bx^{n-1}+\ldots+cx+d$, where the $n>=1$. The color correction unit estimates the parameters of the polynomial fitting model by comparing the two color charts and using, for example, a least squares method mathematically. The least squares method provides an approximate solution for sets of equations in which there are more equations than unknowns. "Least squares" means that the overall solution minimizes the sum of the squares of the errors made in the results of every single equation. For example, when we have a set of paired data (x, y), we can minimize $\Sigma(y-f2(x))*(y-f2(x))$, where "x" is the pixel value of the source image of the first color chart and "y" is the corresponding pixel value of the destination image of the second color chart. Therefore, f2 can be any function to represent the relation. Although the distortion can be incurred at various stages in the method disclosed herein, the color correction unit treats the combined distortion with the combined color correction scheme of the color charts. Therefore, when the color correction unit estimates the parameters of the polynomial fitting model, the color correction unit uses the parameters to process the video input data. The output from the color correction unit is the color calibrated video displayed on the display unit.

The display unit at the destination location therefore displays the color of the first color chart (C1) the same as the color of the second color chart (C2). The color correction system includes both the color charts in the feedback loop, thereby making the color correction system robust and effective. Moreover, the color correction unit is invariant to the distortion caused by the destination image capture device because the destination image capture device captures both the first color chart and the second color chart while capturing the destination source image content. Therefore, the method disclosed herein precludes the need to specially calibrate the destination image capture device. By including the combined distortion factors in the feedback loop formed by the color correction system, the color correction unit corrects the color distortion and then sends the corrected image to the display unit.

FIG. 2 exemplarily illustrates a method for generating calibration parameters used to correct a color distortion of the source image content of a subject displayed on a display unit at a destination location. The color correction unit processes the destination image content with or without the source image content. The color correction unit extracts 201 the first color chart from the captured destination image content or from both the received source image content and the captured destination image content. The color correction unit extracts 202 the second color unit from the captured destination image content. The color correction unit searches 203 for the corners of the first color chart and the second color chart, for example, by performing 2-dimensional (2D) filter matching of the patterns of the corners, or by image segmentation, etc. The color correction unit identifies 204 a first group of pixels surrounded by the corners of the first color chart, where the first group of pixels represents the first color chart. Furthermore, the color correction unit identifies 205 a second group of pixels surrounded by the corners of the second color chart, where the second group of pixels represents the second color chart.

The color correction unit measures 206 the angle between each color chart and a desired position of the color chart and rotates 207 each one of the pixels of the first color chart and the second color chart to align the first color chart and the second color chart to the desired position. The color correction unit measures 208 the size difference between each color chart and the desired size of the color chart and scales 209 each one of the pixels of the first color chart and the second color chart to bring the two color charts to the same desired size. The color correction unit compares 210 the color values of corresponding pixels of the two color charts to determine the differences in the color values. The color correction unit then converts 211 the determined differences to calibration parameters to correct the color of the displayed original image content, that is, the source image content of the subject and the gamma parameters of the display unit. The display unit then displays the corrected source image content with the correct colors.

Figure 3:
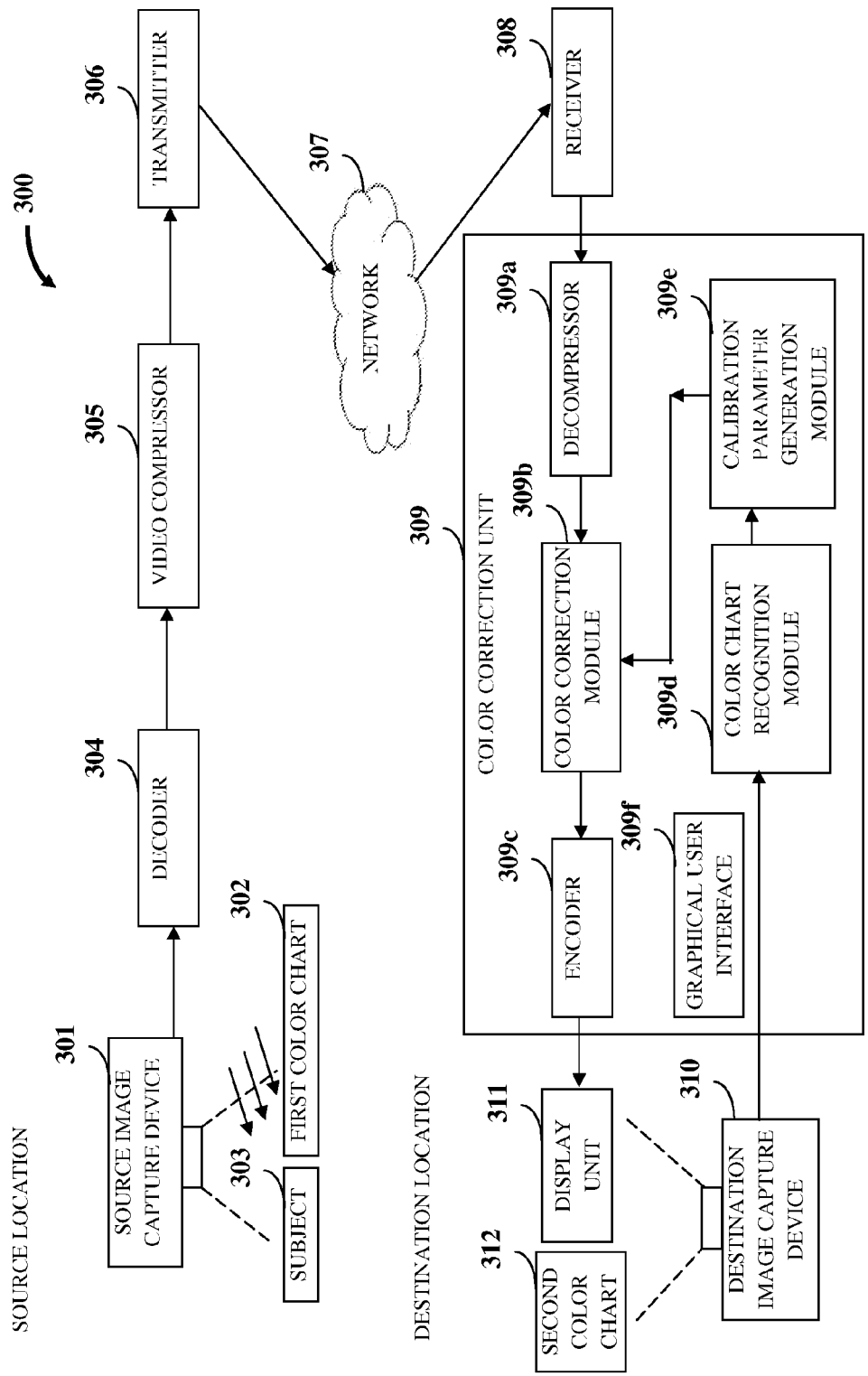
FIG. 3 exemplarily illustrates a color correction system for correcting color of an image of a subject.

FIG. 3 exemplarily illustrates a color correction system 300 for correcting color of an image of a subject 303. As exemplarily illustrated in FIG. 3, the color correction system 300 disclosed herein comprises the first color chart 302, the source image capture device 301, and a transmitter 306 at a source location, and a receiver 308, the color correction unit 309, the second color chart 312, the display unit 311, and the destination image capture device 310 at the destination location. The color correction unit 309 is configured to operate in an automatic mode, a manual mode, and a semi-manual mode. The transmitter 306 communicates with the receiver 308 via the network 307, for example, a wireless communication channel. The first color chart 302 positioned proximal to the subject 303 and the subject 303 are in a field of view of the source image capture device 301 at the source location as exemplarily illustrated in FIG. 3. The source image capture device 301 captures source image content of the subject 303 and the first color chart 302, for example, as analog video signals. The source image content comprises the captured image of the subject 303 and the first color chart 302. In an embodiment, the color correction system 300 disclosed herein further comprises a decoder 304 and a video compressor 305 at the source location. The decoder 304 is operably coupled to the source image capture device 301, for example, via a wired interface such as a universal serial bus (USB) interface or a wireless interface. The decoder 304 converts the analog video signals received from the source image capture device 301 into a digital bit stream. The video compressor 305 is operably coupled to the decoder 304, for example, via a wired interface such as a universal serial bus (USB) interface or a wireless interface. The video compressor 305 reduces the amount of data used to represent digital video images. The video compressor 305 reduces the redundancy in the captured source image content. The video compressor 305 implements a video compression algorithm for compressing the decoded source image content. The video compressor 305 may add impairments to the decoded source image content. The transmitter 306 at the source location transmits the compressed source image content of the subject 303 and the first color chart 302 to the receiver 308 at the destination location via the network 307.

At the destination location, the receiver 308 receives the compressed source image content of the subject 303 and the first color chart 302 from the transmitter 306 via the network 307. The color correction unit 309 operably connected the receiver 308, for example, via a wired interface, a wireless interface, etc., receives the compressed source image content from the receiver 308. The color correction unit 309 automatically recognizes both the color charts 302 and 312, compares the colors of the color charts 302 and 312, and conducts computations. As exemplarily illustrated in FIG. 3, the color correction unit 309 comprises a decompressor 309a, a color chart recognition module 309d, a calibration parameter generation module 309e, a color correction module 309b, and an encoder 309c. The encoder 309c of the color correction unit 309 is operably coupled to the display unit 311. The second color chart 312 which is identical to the first color chart 302 is positioned, for example, on the frame of the display unit 311 in the field of view of the destination image capture device 310 at the destination location. The decompressor 309a decompresses the compressed source image content of the subject 303 and the first color chart 302. The color correction module 309b receives the decompressed source image content, performs color correction, and transmits the corrected source image content to the encoder 309c. The encoder 309c converts the format of the corrected source image content of the subject 303 into a predefined display format for display on the display unit 311.

The display unit 311 displays the received source image content of the subject 303 and the first color chart 302 at the destination location. The destination image capture device 310 is positioned facing the display unit 311. The destination image capture device 310 at the destination location captures destination image content of the second color chart 312 and the displayed source image content of the subject 303 and the first color chart 302. The color correction unit 309 receives the captured destination image content from the destination image capture device 310. The color chart recognition module 309d of the color correction unit 309 extracts the first color chart 302 from the received source image content and/or from the captured destination image content, and extracts the second color chart 312 from the captured destination image content. The color chart recognition module 309d identifies characteristics of the first color chart 302 from the received source image content and/or from the captured destination image content, and characteristics of the second color chart 312 from the captured destination image content for extracting the first color chart 302 and the second color chart 312 respectively. The calibration parameter generation module 309e generates calibration parameters by comparing the extracted first color chart 302 and the extracted second color chart 312. The calibration parameter generation module 309e generates the calibration parameters as disclosed in the detailed description of FIG. 2. The color correction module 309b corrects the color distortion of the received source image content of the subject 303 displayed on the display unit 311 at the destination location using the generated calibration parameters to correct the color of the image of the subject 303 on the display unit 311 at the destination location. The encoder 309c converts the corrected source image content of the subject 303 into a predefined display format. The display unit 311 then displays the corrected source image content of the subject 303. The color correction module 309b performs a gamma correction of the received source image content of the subject 303 on the display unit 311.

In an embodiment, the color correction unit 309 comprises a graphical user interface (GUI) 309f and/or interface elements configured to acquire inputs from a user in a manual mode for highlighting the first color chart 302 extracted from the received source image content and/or from the captured destination image content, and/or the second color chart 312 extracted from the captured destination image content, for adjusting the generated calibration parameters to correct the color distortion of the received source image content of the subject 303 displayed on the display unit 311, etc. The user adjusts the generated calibration parameters by comparing the displayed first color chart 302 and the second color chart 312 proximal to the display unit 311. The color correction unit 309 is configured to correct the color distortion of the received source image content of the subject 303 displayed on the display unit 311 at the destination location using the acquired inputs.

The color correction system 300 disclosed herein considers each distortion factor occurring in the entire communication channel that impairs the color of the image. The color correction system 300 thereby performs an end-to-end calibration as the color correction system 300 encompasses all components of the communication channel through which the image passes. The color correction system 300 can therefore correct and compensate any color distortion occurring in the image in the entire communication channel, end to end. The color correction unit 309 of the color correction system 300 disclosed herein corrects color distortions that occur in any stage in the communication channel, for example, from the source image capture device 301 at the source location to the display unit 311 at the destination location. This is because the entire communication channel is enclosed in the feedback loop as disclosed in the detailed description of FIG. 1 and any color distortion occurring within the feedback loop is automatically corrected by the color correction unit 309. The color correction unit 309 generates true color video as an output.

FIG. 4 exemplarily illustrates a block diagram of the color correction unit 309 that communicates with a source image capture device 301 at a source location and a destination image capture device 310 at a destination location. The color correction unit 309 communicates with the source image capture device 301 at the source location via a network 307 exemplarily illustrated in FIG. 3. The color correction unit 309 is operably connected to the display unit 311 and the destination image capture device 310 at the destination location. The color correction unit 309 comprises one or more input buffer and format converters 309g and 309h, for example, a first input buffer and format converter 309g and a second input buffer and format converter 309h as exemplarily illustrated in FIG. 4. The color correction unit 309 further comprises a color chart recognition module 309d, a calibration parameter generation module 309e, a color correction module 309b, an output buffer and format converter 309i, and an encoder 309c. The color correction unit 309 further comprises at least one processor 502a as exemplarily illustrated in FIG. 5, and a non-transitory computer readable storage medium communicatively coupled to the processor 502a. The non-transitory computer readable storage medium is configured to store the modules 309g, 309h, 309d, 309e, 309b, 309i, 309j, and 309c of the color correction unit 309 that are executable by the processor 502a.

The first input buffer and format converter 309g of the color correction unit 309 receives the source image content of the subject 303 and the first color chart 302 exemplarily illustrated in FIG. 3, captured by the source image capture device 301 via the network 307. The first input buffer and format converter 309g buffers the received source image content. As used herein, the term "buffering" refers to temporarily holding the input data, that is, the received source image content while the input data is being moved from one location to another. Moreover, the first input buffer and format converter 309g converts a format of the buffered source image content into a predefined color image format, for example, an internal red, green, blue (RGB) color format. The first input buffer and format converter 309g stores the received source image content in a buffer memory location and converts the received source image content from a raw data format into the RGB format when required. The color chart recognition module 309d receives the formatted source image content from the buffer memory location and utilizes the sequence of images or image frames for color chart recognition. The color chart recognition module 309d segments the images for extracting the first color chart 302. The color chart recognition module 309d identifies characteristics of the first color chart 302 from the received source image content and/or the received destination image content for extracting the first color chart 302. The color chart recognition module 309d therefore recognizes and extracts the first color chart 302 embedded in the received source image content. In an embodiment, the color chart recognition module 309d extracts the first color chart 302 from the received destination image content or from both the received source image content and the captured destination image content. The frequency of the color chart extraction depends on hardware computation capability. For example, the color chart recognition module 309d may extract the first color chart 302 per image frame, or per few image frames. The color chart recognition module 309d outputs and sends the extracted first color chart 302 to the calibration parameter generation module 309e for generation of the calibration parameters.

The second input buffer and format converter 309h of the color correction unit 309 receives the destination image content of the second color chart 312, exemplarily illustrated in FIG. 3, and the displayed source image content of the subject 303 and the first color chart 302 from the destination image capture device 310. The second input buffer and format converter 309h buffers the received destination image content. Moreover, the second input buffer and format converter 309h converts a format of the buffered destination image content into a predefined color image format, for example, an internal RGB format. That is, the second input buffer and format converter 309h stores the received destination image content into a buffer memory location and converts the received destination image content from a raw data format into the RGB format when required. The color chart recognition module 309d receives the formatted destination image content from the buffer memory location and utilizes the sequence of images or image frames for color chart recognition. The color chart recognition module 309d segments the images for extracting the second color chart 312. The color chart recognition module 309d identifies characteristics of the second color chart 312 from the received destination image content. The color chart recognition module 309d therefore recognizes and extracts the second color chart 312 embedded in the received destination image content. The frequency of the color chart extraction depends on hardware computation capability. For example, the color chart recognition module 309d may extract the second color chart 312 per image frame or per few image frames. The color chart recognition module 309d outputs and sends the extracted second color chart 312 to the calibration parameter generation module 309e for generation of the calibration parameters. The calibration parameter generation module 309e compares the first color chart 302 extracted from the received source image content or from the received destination image content or from both the received source image content and the captured destination image content, with the second color chart 312 extracted from the received destination image content for calibration parameter generation.

The calibration parameter generation module 309e uses the extracted first color chart 302 and the extracted second color chart 312 for generation of calibration parameters. The calibration parameter generation module 309e generates calibration parameters by comparing the extracted first color chart 302 with the extracted second color chart 312. The calibration parameter generation module 309e rotates and scales the extracted first color chart 302 and the extracted second color chart 312, to allow the extracted first color chart 302 and the extracted second color chart 312 to be compared. The calibration parameter generation module 309e compares color values of corresponding pixels on the rotated and scaled first color chart 302 and the rotated and scaled second color chart 312 to determine differences in the color values. The calibration parameter generation module 309e converts the determined differences in the color values of the corresponding pixels on the rotated and scaled first color chart 302 and the rotated and scaled second color chart 312 to calibration parameters.

In an embodiment, the calibration parameter generation module 309e estimates the calibration parameters based on a difference between the second color chart 312 and the calibrated first color chart 302. When the difference between the two color charts 302 and 312 is small, the calibration parameters estimation result is good. When the difference between the two color charts 302 and 312 is large, the calibration parameter generation module 309e adjusts the calibration parameters. The calibration parameter generation module 309e utilizes, for example, the least squares method to estimate the calibration parameters continuously. The calibration parameter generation module 309e transfers the generated calibration parameters to the color correction module 309b. The color correction module 309b receives two inputs, that is, the generated calibration parameters and the buffered and formatted source image content.

The color correction module 309b corrects the color distortion of the received source image content of the subject 303 displayed on the display unit 311 at the destination location using the generated calibration parameters to correct the color of the image of the subject 303 on the display unit 311 at the destination location. The color correction module 309b outputs calibrated source image content of the subject 303. Consider an example where $\{r(i,j),g(i,j),b(i,j)\}$ is a digital color representation of a pixel at a location (i,j) in an image. The color corrected digital representation is $\{f_r(r(i,j)), f_g(g(i,j)), f_b(b(i,j))\}$, where $f_r$, $f_g$, or $f_b$ is the n'th degree polynomial fitting function. The polynomial fitting function coefficients are derived from the comparison of the first color chart 302 and the second color chart 312, for example, by using the least squares method. The fitting function and the parameter estimation method are not limited to the polynomial fitting function and the least squares method respectively. For purposes of illustration, the detailed description refers to a fitting function, for example, a polynomial fitting function and a parameter estimation method, for example, a least squares method; however the scope of the method and system 300 disclosed herein is not limited to the polynomial fitting function and the least squares method but may be extended to include other functions and/or methods used for derivation of the coefficients. For example, a neural network may be used to replace the polynomial fitting function. Furthermore, the color correction module 309b performs a gamma correction of the received source image content of the subject 303 on the display unit 311 using the generated calibration parameters.

The color correction unit 309 operates, for example, in an automatic mode and a manual mode. The automatic mode may be set as the default working mode of the color correction unit 309. In the automatic mode, the calibration parameter generation module 309e applies a calibration algorithm on the extracted first color chart 302 and the extracted second color chart 312 to generate a set of calibration parameters. The calibration parameter generation module 309e sends the set of calibration parameters to the color correction module 309b for color correction.

In the manual mode, the graphical user interface (GUI) 309f of the color correction unit 309 enables a user at the destination location to highlight either the first color chart 302 or both the first color chart 302 and the second color chart 312 using an input device, for example, a computer mouse, keyboard, a touch pad, a light pen, etc., connected to a peripheral interface of the color correction unit 309. In an embodiment, the user enters inputs using the interface elements, for example, push buttons, touch pads, physical keys, sliding buttons, knobs, etc., provided on the color correction unit 309. In an embodiment, the color correction unit 309 further comprises an adjustment module 309j that enables the user at the destination location to adjust the color of the image, for example, through the GUI 309f or using the interface elements of the color correction unit 309. The adjustment module 309j monitors the input device. When the user activates the manual mode, the adjustment module 309j uses the user inputs to control the color charts 302 and 312 on the GUI 309f. The highlighted color charts 302 and 312 are then transferred to the color correction module 309b of the color correction unit 309 to correct the color of the subject 303 displayed on the display unit 311. The manual mode is configured, for example, as a backup mode. The user can test and debug the color correction unit 309 in the manual mode.

The output buffer and format converter 309i converts a format of the color corrected source image content of the subject 303 with the corrected color distortion into a predefined display format, that is, an output data format suitable for display on the display unit 311. The output buffer and format converter 309i buffers the converted source image content of the subject 303 for display on the display unit 311. The output buffer and format converter 309i transfers the color corrected source image content from a buffer memory location to the display unit 311 at the destination location. In an embodiment, the encoder 309c converts the format of the corrected source image content of the subject 303 into a predefined display format for display on the display unit 311.

Figure 5:
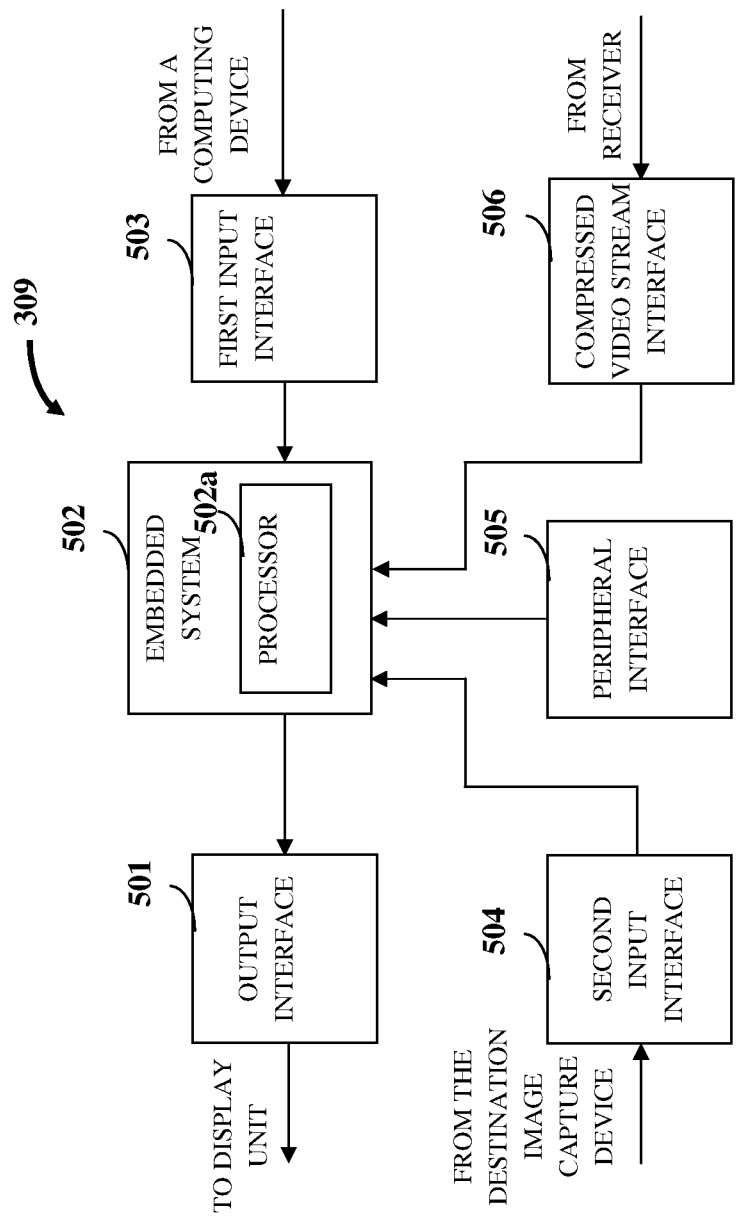
FIG. 5 exemplarily illustrates a hardware implementation of the color correction unit.

FIG. 5 exemplarily illustrates a hardware implementation of the color correction unit 309. The color correction unit 309 is configured as a hardware color correction box comprising computer hardware and software that can be used with any existing or new video communication system such as an emergency medical service (EMS) system. The color correction unit 309 performs computations and display parameter adjustment according to the method disclosed in the detailed description of FIGS. 1-4. The color correction unit 309 is installed at the destination location, for example, at an EMS department of a hospital. In the hardware implementation of the color correction unit 309, the color correction unit 309 comprises, for example, a first input interface 503, an embedded system 502, a second input interface 504, a compressed video stream interface 506, a peripheral interface 505, and an output interface 501. The first input interface 503 of the color correction unit 309 connects to a computing device, for example, a personal computer, a laptop, a mobile device, a tablet computing device, etc., at the destination location. The computing device receives the source image content transmitted from a source location via a receiver 308 as exemplarily illustrated in FIG. 3 and FIG. 7. The first input interface 503 transfers data, for example, the source image content, received at the computing device to the embedded system 502 of the color correction unit 309.

The embedded system 502 performs dedicated or specific functions. The embedded system 502 implements multiple functions, for example, video decompression, color correction software, video encoder functionalities, etc. Moreover, the embedded system 502 handles the user input functions for manual adjustment in the manual mode of operation. The embedded system 502 is, for example, DM816x evaluation module of Spectrum Digital, Inc. The embedded system 502 comprises a processor 502a, an operating system such as the Linux® operating system, and the required data and display interfaces.

The destination image capture device 310 connects to the embedded system 502 of the color correction unit 309 via the second input interface 504 for sending the captured destination image content to the color correction unit 309. The receiver 308 connects to the embedded system 502 via the compressed video stream interface 506. The embedded system 502 receives compressed video stream data through the compressed video stream interface 506. A user's input device, for example, a computer mouse, a touch pad, a keyboard, etc., connects to the embedded system 502 via the peripheral interface 505. The output interface 501 of the color correction unit 309 connects to the display unit 311 at the destination location. The output data from the embedded system 502 is transferred to the display unit 311 at the destination location via the output interface 501. In an embodiment, the color correction unit 309 provides direct access to the embedded system 502 via the peripheral interface 505. The peripheral interface 505 is, for example, a universal serial bus (USB) interface, a personal system/2 (PS/2) interface, etc.

In order to incorporate the color correction unit 309 into a conventional emergency medical services (EMS) system, a user may disconnect the display unit 311 from the computing device and connect the color correction unit 309 between the computing device and the display unit 311. The software is pre-installed in the color correction unit 309 and the users do not need to install any software or driver to support the color correction unit 309 because the color correction unit 309 is independent of the communication system and/or hardware of the EMS system.

The embedded system 502 employs the operating system for performing multiple tasks. The operating system is responsible for management and coordination of activities and sharing of resources of the embedded system 502. The operating system further manages security of the embedded system 502, peripheral devices connected to the embedded system 502, and network connections. The operating system employed on the embedded system 502 recognizes, for example, inputs provided by the user using the input device, the output display, the interface elements, the GUI 309f exemplarily illustrated in FIG. 3, etc. The operating system on the embedded system 502 executes different programs using the processor 502a. The processor 502a of the embedded system 502 is an electronic circuit that executes computer programs. The processor 502a executes the modules, for example, the first input buffer and format converter 309g, the second input buffer and format converter 309h, the color chart recognition module 309d, the calibration parameter generation module 309e, the color correction module 309b, the output buffer and format converter 309i, etc., of the color correction unit 309 exemplarily illustrated in FIGS. 3-4.

The processor 502a fetches instructions defined by the modules, for example, 309g, 309h, 309d, 309e, 309b, 309i, etc., processes, and decodes them. The instructions are stored in an instruction register in the processor 502a. After processing and decoding, the processor 502a executes the instructions. In an example, the first input buffer and format converter 309g of the color correction unit 309 defines instructions for buffering the received source image content and for converting the format of the buffered source image content into a predefined color image format, for example, an internal RGB format. The second input buffer and format converter 309h defines instructions for buffering the received destination image content and for converting the format of the buffered destination image content into a predefined color image format, for example, an internal RGB format. The color chart recognition module 309d of the color correction unit 309 defines instructions for extracting the first color chart 302 from the formatted source image content and/or from the formatted destination image content, and for extracting the second color chart 312 from the formatted destination image content. The color chart recognition module 309d defines instructions for segmenting the formatted source image content and/or the formatted destination image content for extracting the first color chart 302, and for segmenting the captured destination image content for extracting the second color chart 312. The color chart recognition module 309d defines instructions for identifying characteristics of the first color chart 302 from the formatted source image content and/or from the formatted destination image content, and for identifying characteristics of the second color chart 312 from the formatted destination image content, for extracting the first color chart 302 and the second color chart 312 respectively.

The calibration parameter generation module 309e defines instructions for generating calibration parameters by comparing the extracted first color chart 302 and the extracted second color chart 312. For generating the calibration parameters, the calibration parameter generation module 309e defines instructions for rotating and scaling the extracted first color chart 302 and the extracted second color chart 312, to allow the extracted first color chart 302 and the extracted second color chart 312 to be compared. The calibration parameter generation module 309e further defines instructions for comparing color values of corresponding pixels on the rotated and scaled first color chart 302 and the rotated and scaled second color chart 312 to determine differences in the color values, where the differences in the color values of the corresponding pixels on the rotated and scaled first color chart 302 and the rotated and scaled second color chart 312 identify a color distortion of the received source image content of the first color chart 302. The calibration parameter generation module 309e further defines instructions for converting the determined differences in the color values of the corresponding pixels on the rotated and scaled first color chart 302 and the rotated and scaled second color chart 312 to calibration parameters.

The color correction module 309b defines instructions for correcting the color distortion of the received source image content of the subject 303 displayed on the display unit 311 at the destination location using the generated calibration parameters to correct the color of the image of the subject 303 on the display unit 311 at the destination location. The color correction module 309b further defines instructions for performing a gamma correction of the received source image content of the subject 303 on the display unit 311 using the generated calibration parameters. The output buffer and format converter 309i defines instructions for converting the format of the color corrected source image content of the subject 303 into a predefined display format, that is, an output data format suitable for the display unit 311. Furthermore, the output buffer and format converter 309i defines instructions for buffering the converted source image content of the subject 303 for display on the display unit 311.

The processor 502a of the embedded system 502 retrieves the instructions defined by the first input buffer and format converter 309g, the second input buffer and format converter 309h, the color chart recognition module 309d, the calibration parameter generation module 309e, the color correction module 309b, and the output buffer and format converter 309i, and executes the instructions.

At the time of execution, the instructions stored in the instruction register are examined to determine the operations to be performed. The processor 502a then performs the specified operations. The operations comprise arithmetic operations and logic operations. The operating system performs multiple routines for performing a number of tasks required to assign the input devices, the output devices, and memory for execution of the modules, for example, 309g, 309h, 309d, 309e, 309b, 309i, etc., of the color correction unit 309. The tasks performed by the operating system comprise, for example, assigning memory to the modules, for example, 309g, 309h, 309d, 309e, 309b, 309i, etc., of the color correction unit 309, and to data used by the color correction unit 309, and handling input/output operations. The operating system performs the tasks on request by the operations and after performing the tasks, the operating system transfers the execution control back to the processor 502a. The processor 502a continues the execution to obtain one or more outputs. The outputs of the execution of the modules, for example, 309g, 309h, 309d, 309e, 309b, 309i, etc., of the color correction unit 309 are displayed to the user on the display unit 311.

Disclosed herein is also a computer program product comprising a non-transitory computer readable storage medium that stores computer program codes comprising instructions executable by at least one processor 502a for correcting color of an image of a subject 303. The color correction unit 309 comprises the processor 502a communicatively coupled to the non-transitory computer readable storage medium configured to store instructions executable by the processor 502a, where the instructions are configured to correct the color of the image of the subject 303 on the display unit 311 at the destination location. As used herein, the term "non-transitory computer readable storage medium" refers to all computer readable media, for example, non-volatile media such as optical disks or magnetic disks, volatile media such as a register memory, a processor cache, etc., and transmission media such as wires that constitute a system bus coupled to the processor 502a, except for a transitory, propagating signal.

The computer program codes comprise a first computer program code for receiving source image content of the subject 303 and the first color chart 302 from the source image capture device 301 positioned at the source location via the network 307; a second computer program code for receiving destination image content of the second color chart 312 and the source image content of the subject 303 and the first color chart 302 displayed on the display unit 311 at the destination location from the destination image capture device 310; a third computer program code for extracting the first color chart 302 from the received destination image content or from the combination of the received source image content and the received destination image content; a fourth computer program code for extracting the second color chart 312 from the received destination image content; a fifth computer program code for generating calibration parameters by comparing the extracted first color chart 302 and the extracted second color chart 312; and a sixth computer program code for correcting a color distortion of the received source image content of the subject 303 displayed on the display unit 311 at the destination location using the generated calibration parameters to correct a color of an image of the subject 303 on the display unit 311 at the destination location.

The computer program codes further comprise a seventh computer program code for rotating and scaling the extracted first color chart 302 and the extracted second color chart 312; an eighth computer program code for comparing color values of corresponding pixels on the rotated and scaled first color chart 302 and the rotated and scaled second color chart 312 to determine differences in the color values, where the differences in the color values of the corresponding pixels on the rotated and scaled first color chart 302 and the rotated and scaled second color chart 312 identify the color distortion of the received source image content of the first color chart 302 displayed on the display unit 311; and a ninth computer program code for converting the determined differences in the color values of the corresponding pixels on the rotated and scaled first color chart 302 and the rotated and scaled second color chart 312 to calibration parameters. The computer program product disclosed herein further comprises one or more additional computer program codes for performing additional steps that may be required and contemplated for correcting color of an image of a subject 303. In an embodiment, a single piece of computer program code comprising computer executable instructions performs one or more steps of the method disclosed herein for correcting color of an image of a subject 303.

The computer program codes comprising computer executable instructions are embodied on the non-transitory computer readable storage medium. The processor 502a of the embedded system 502 retrieves these computer executable instructions and executes them. When the computer executable instructions are executed by the processor 502a, the computer executable instructions cause the processor 502a to perform the steps of the method for correcting color of an image of a subject 303.

Figure 6:
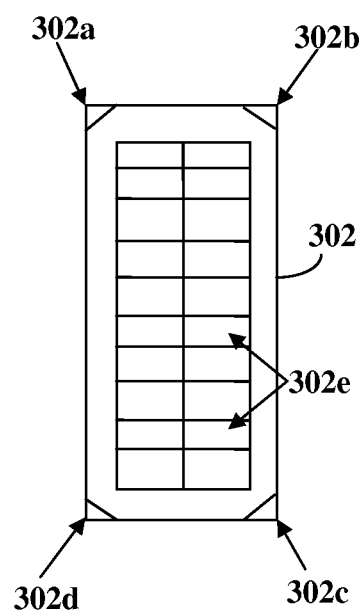
FIG. 6 exemplarily illustrates a design of a color chart.

FIG. 6 exemplarily illustrates a design of a color chart 302. The color chart 302 is identical to the second color chart 312 exemplarily illustrated in FIG. 3. Each of the corners 302a, 302*b*, 302*c*, and 302*d* of the color chart 302 is configured to have a predetermined shape, pattern, and/or color. For example, the four corners 302*a*, 302*b*, 302*c*, and 302*d* of the color chart 302 can be marked with four different colors 302*e* within triangles as exemplarily illustrated in FIG. 6. The color chart recognition module 309*d* of the color correction unit 309 exemplarily illustrated in FIGS. 3-4 can be trained to identify the shape, pattern or color in a window. The window is smaller than the size of the image frames having the embedded color chart 302. When the window is moving around the image, the color chart recognition module 309*d* identifies the four corners 302*a*, 302*b*, 302*c*, and 302*d* of the color chart 302. The color chart recognition module 309*d* is configured as a neural network or a classifier. For training the color chart recognition module 309*d*, the patterns of the four corners 302*a*, 302*b*, 302*c*, and 302*d* of the color chart 302 are scaled to different sizes and rotated to different angles to generate a training data set. After training, if any one of the corners 302*a*, 302*b*, 302*c*, and 302*d* appears in a window, the color chart recognition module 309*d* recognizes the corner 302*a*, 302*b*, 302*c*, or 302*d* automatically. When the color chart 302 is located and recognized, the color chart recognition module 309*d* cuts, rotates, and rescales the color chart 302 to a predefined format, such that the color difference between the color charts 302 and 312 can be compared and the color correction functions can be estimated to correct the colors. The color chart 302 is divided into multiple blocks filled with different colors 302*e*. The color charts 302 and 312 are designed by taking into consideration the colors 302*e* associated, for example, with the skin, blood, and other human features, for example, hair, eyes, etc. The color chart 302 is easily recognizable by the color chart recognition module 309*d*.

Figure 7:
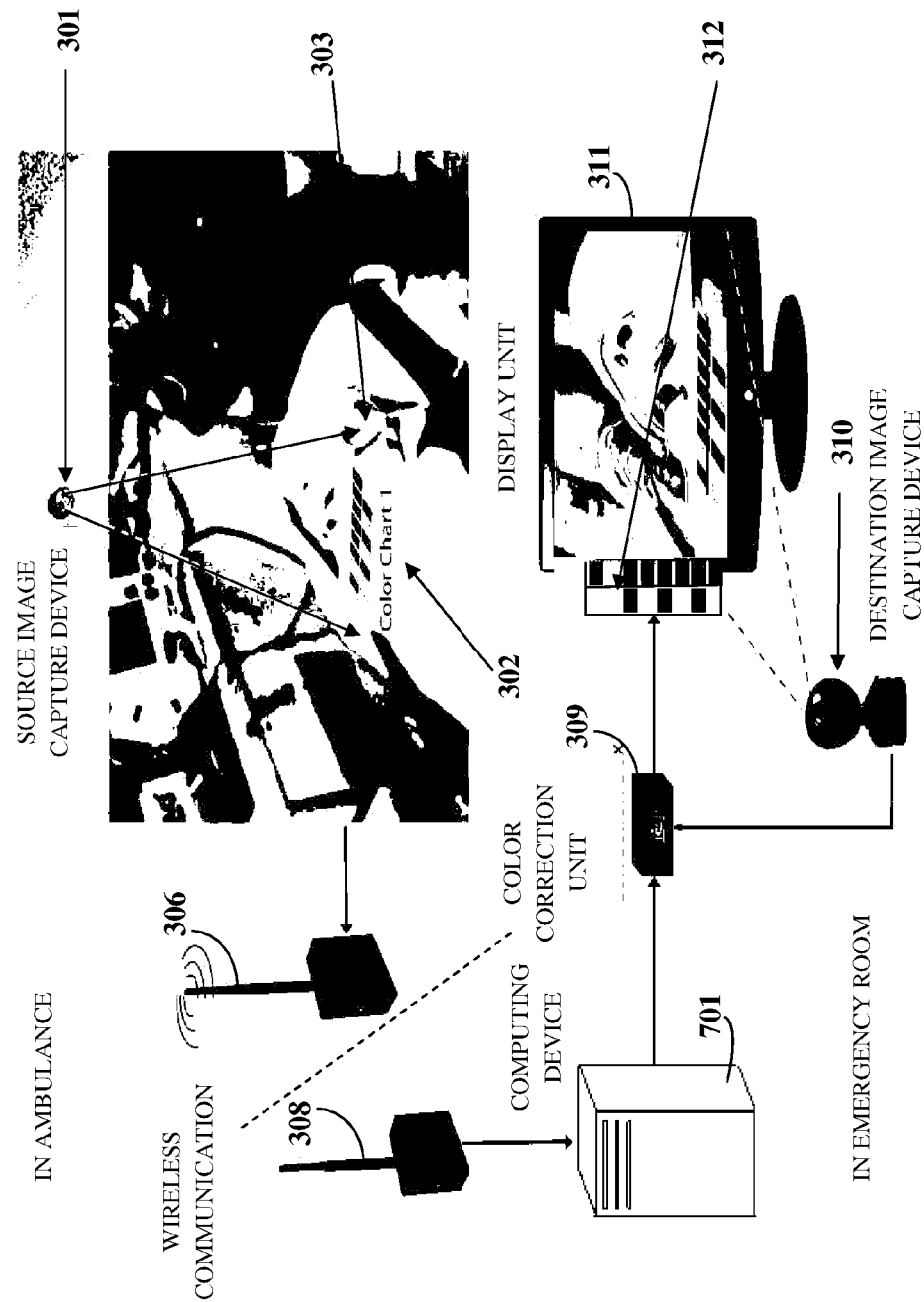
FIG. 7 exemplarily illustrates color correction of an image using the color correction system disclosed herein.

FIG. 7 exemplarily illustrates color correction of an image using the color correction system 300 disclosed herein. Consider an example of the color correction system 300 in an emergency medical service (EMS) application. In this example, the source location is an emergency medical vehicle, for example, an ambulance or a pre-hospital setting, and the destination location is an emergency room in an EMS department of a hospital. Inside the ambulance, the first color chart 302 is positioned next to a patient within the field of view of the source image capture device 301. The source image capture device 301 captures source image content of both the first color chart 302 and the subject 303, for example, the patient. A transmitter 306 in the ambulance wirelessly communicates the images of the subject 303 and the first color chart 302 captured by the source image capture device 301 to a receiver 308 at the EMS department of the hospital for further communication. The receiver 308 communicates the images of the subject 303 and the first color chart 302 to a computing device 701, for example, a laptop, a personal computer, a personal digital assistant, a mobile phone, a tablet computing device, etc., at the EMS department. At the EMS department, the color correction unit 309 is connected to the computing device 701 and the display unit 311. Moreover, the destination image capture device 310 is connected to the color correction unit 309 facing the display unit 311. The second color chart 312 identical to the first color chart 302 is attached to the frame of the display unit 311. The destination image capture device 310 captures images of both the second color chart 312 and the display unit 311.

The color correction unit 309 automatically recognizes the first color chart 302 from the source image content received from the computing device 701, and the second color chart 312 from the destination image content, compares the colors of the two color charts 302 and 312, and conducts computations. In an embodiment, if the source image content is of low quality, the color correction unit 309 uses both the source image content and the destination image content to identify the first color chart 302. The color correction unit 309 automatically adjusts the displayed video colors and gamma parameters in real time using the calibration parameters generated by the color correction unit 309. The color correction unit 309 corrects color distortion caused, for example, by lighting conditions in both the ambulance and the emergency room (ER), the source image capture device 301, coding, video compression, wireless communication, display unit settings, etc. The color correction unit 309 generates the true color video as the output by end-to-end calibration. The color correction unit 309 provides color correction in various formats, for example, RGB, HSV, HSL formats, and gamma correction. The color correction system 300 can correct and compensate any color distortion in the entire communication channel via end to end calibration. In the automatic mode of operation, the color correction unit 309 performs the color calibration automatically. Moreover, a user can also use, for example, a computer mouse or a touch screen with the graphical user interface (GUI) 309*f* for color correction as a backup mode. The color correction unit 309 allows the user to select the manual mode or the semi-automatic mode if required. The color correction unit 309 provides the GUI 309*f* to allow the user to manually point out the color chart location and easily calibrate and display images of the subject 303 in true color. The semi-automatic mode allows color correction in a partial automatic mode and a partial manual mode.

The software modules, for example, 309*g*, 309*h*, 309*d*, 309*e*, 309*b*, 309*i*, etc., exemplarily illustrated in FIGS. 3-4, are preinstalled in the color correction unit 309. The color correction system 300 disclosed herein is a hardware independent communication system. The color correction system 300 can be utilized for true color video over mobile networks, for example, from an ambulance on route, and in other public safety applications. The videos used for emergency medical service (EMS) applications must retain color truth throughout the video system. Any impairment of the information of the color during the recording, transfer, and/or display of video could be life-threatening as the color of blood and skin is often used to make critical diagnoses. The color correction system 300 disclosed herein corrects color distortion due to data compression algorithms, communication channels, the display unit 311, the lighting conditions, etc., caused during transmission of the video over mobile networks.

The method and system 300 disclosed herein can be used in any emergency medical system (EMS) system as the color correction system 300 is independent of the video communication system used by the EMS system. The color correction system 300 works with existing mobile telemedicine systems, for example, the e-Bridge™ system of General Devices. The method and system 300 disclosed herein can be used in multiple applications, for example, television (TV) broadcasting, product inspection, telemedicine, medical education, remote learning, video conferencing, video game playing, thermal imaging, etc.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, and digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise MATLAB® of MathWorks, Inc., C, C++, C#, Perl®, Python®, or JAVA. The computer program codes or software programs may be stored on or in one or more mediums as object code. The computer program product disclosed herein comprises computer executable instructions embodied in a non-transitory computer readable storage medium, wherein the computer program product comprises one or more computer program codes for implementing the processes of various embodiments.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A method for correcting color of an image of a subject, comprising:

providing a color correction system, comprising:

a first color chart positioned proximal to said subject, wherein said first color chart and said subject are positioned in a field of view of a source image capture device at a source location;

a second color chart identical to said first color chart and positioned proximal to a display unit, wherein said second color chart and said display unit are positioned in a field of view of a destination image capture device at a destination location; and a color correction unit operably connected to said display unit and said destination image capture device at said destination location, said color correction unit comprising at least one processor communicatively coupled to a non-transitory computer readable storage medium configured to store instructions executable by said at least one processor, said instructions configured to correct said color of said image of said subject on said display unit at said destination location;

capturing source image content of said subject and said first color chart by said source image capture device, wherein said source image capture device is configured to transmit said captured source image content of said subject and said first color chart from said source location to said color correction unit at said destination location via a network, and wherein said color correction unit is configured to send said captured source image content of said subject and said first color chart received from said source image capture device via said network, to said display unit at said destination location;

displaying said received source image content of said subject and said first color chart on said display unit at said destination location;

capturing destination image content of said second color chart and said displayed source image content of said subject and said first color chart by said destination image capture device;

generating calibration parameters by said color correction unit by comparing said first color chart extracted from one of said captured destination image content and a combination of said received source image content and said captured destination image content, with said second color chart extracted from said captured destination image content; and correcting a color distortion of said received source image content of said subject displayed on said display unit at said destination location using said generated calibration parameters by said color correction unit to correct said color of said image of said subject on said display unit at said destination location.

2. The method of claim 1, wherein said generation of said calibration parameters by said color correction unit comprises:
- recognizing and extracting said first color chart from said one of said captured destination image content and said combination of said received source image content and said captured destination image content;
- recognizing and extracting said second color chart from said captured destination image content;
- rotating and scaling said extracted first color chart and said extracted second color chart;
- comparing color values of corresponding pixels on said rotated and scaled first color chart and said rotated and scaled second color chart to determine differences in said color values, wherein said differences in said color values of said corresponding pixels on said rotated and scaled first color chart and said rotated and scaled second color chart identify said color distortion of said received source image content of said first color chart displayed on said display unit; and
- converting said determined differences in said color values of said corresponding pixels on said rotated and scaled first color chart and said rotated and scaled second color chart to said calibration parameters.

3. The method of claim 2, wherein said color correction unit is configured to rotate and scale said extracted first color chart and said extracted second color chart for aligning said extracted first color chart and said extracted second color chart to perform a pixel to pixel comparison of said extracted first color chart and said extracted second color chart.

4. The method of claim 1, further comprising performing a gamma correction of said received source image content of said subject on said display unit by said color correction unit using said generated calibration parameters.

5. The method of claim 1, wherein each corner of said first color chart and said second color chart is configured to have one or more of a predetermined shape, color, pattern, and a lighting element.

6. The method of claim 1, further comprising segmenting said one of said captured destination image content and said combination of said received source image content and said captured destination image content by said color correction unit for extracting said first color chart from said one of said captured destination image content and said combination of said received source image content and said captured destination image content.

7. The method of claim 1, further comprising segmenting said captured destination image content by said color correction unit for extracting said second color chart from said captured destination image content.

8. The method of claim 1, further comprising identifying characteristics of said first color chart from said one of said captured destination image content and said combination of said received source image content and said captured destination image content, and characteristics of said second color chart from said captured destination image content, by said color correction unit for extracting said first color chart and said second color chart respectively.

9. The method of claim 1, wherein said color correction unit comprises one or more of a graphical user interface and interface elements configured to acquire inputs from a user for one or more of:
- highlighting one or more of said first color chart extracted from said one of said captured destination image content and said combination of said received source image content and said captured destination image content, and said second color chart extracted from said captured destination image content; and
- adjusting said generated calibration parameters to correct said color distortion of said received source image content of said subject displayed on said display unit at said destination location.

10. The method of claim 1, further comprising buffering said received source image content and converting a format of said buffered source image content into a predefined color image format by said color correction unit.

11. The method of claim 1, further comprising buffering said captured destination image content and converting a format of said buffered destination image content into a predefined color image format by said color correction unit.

12. The method of claim 1, further comprising converting a format of corrected source image content of said subject with said corrected color distortion into a predefined display format by said color correction unit for display on said display unit.

13. A color correction system for correcting color of an image of a subject, comprising:
- a first color chart positioned proximal to said subject, wherein said first color chart and said subject are positioned in a field of view of a source image capture device at a source location;
- said source image capture device configured to capture source image content of said subject and said first color chart and transmit said captured source image content of said subject and said first color chart from said source location to a color correction unit at a destination location via a network;
- a second color chart identical to said first color chart and positioned proximal to a display unit, wherein said second color chart and said display unit are positioned in a field of view of a destination image capture device at said destination location;
- said color correction unit operably connected to said display unit and said destination image capture device at said destination location, wherein said color correction unit is configured to send said captured source image content of said subject and said first color chart received from said source image capture device via said network to said display unit at said destination location;
- said display unit configured to display said received source image content of said subject and said first color chart at said destination location;
- said destination image capture device configured to capture destination image content of said second color chart and said displayed source image content of said subject and said first color chart; and
- said color correction unit comprising:
  - at least one processor;
  - a non-transitory computer readable storage medium communicatively coupled to said at least one processor, said non-transitory computer readable storage medium configured to store modules of said color correction unit that are executable by said at least one processor, said modules of said color correction unit comprising:
    - a color chart recognition module configured to recognize and extract said first color chart from one of said captured destination image content and a combination of said received source image content and said captured destination image content, and to recognize and extract said second color chart from said captured destination image content;

a calibration parameter generation module configured to generate calibration parameters by comparing said extracted first color chart with said extracted second color chart; and a color correction module configured to correct a color distortion of said received source image content of said subject displayed on said display unit at said destination location using said generated calibration parameters to correct said color of said image of said subject on said display unit at said destination location.

14. The color correction system of claim 13, wherein each corner of said first color chart and said second color chart is configured to have one or more of a predetermined shape, color, pattern, and a lighting element.

15. The color correction system of claim 13, further comprising a transmitter operably connected to said source image capture device at said source location, wherein said transmitter is configured to transmit said captured source image content of said subject and said first color chart from said source location to a receiver at said destination location via said network, wherein said receiver is operably connected to said color correction unit.

16. The color correction system of claim 13, wherein said calibration parameter generation module of said color correction unit is configured to perform:

rotating and scaling said extracted first color chart and said extracted second color chart;

comparing color values of corresponding pixels on said rotated and scaled first color chart and said rotated and scaled second color chart to determine differences in said color values, wherein said differences in said color values of said corresponding pixels on said rotated and scaled first color chart and said rotated and scaled second color chart identify said color distortion of said received source image content of said first color chart displayed on said display unit; and converting said determined differences in said color values of said corresponding pixels on said rotated and scaled first color chart and said rotated and scaled second color chart to said calibration parameters.

17. The color correction system of claim 13, wherein said color correction module of said color correction unit is further configured to perform a gamma correction of said received source image content of said subject on said display unit using said generated calibration parameters.

18. The color correction system of claim 13, wherein said color chart recognition module of said color correction unit is further configured to segment said one of said captured destination image content and said combination of said received source image content and said captured destination image content for extracting said first color chart from said one of said captured destination image content and said combination of said received source image content and said captured destination image content.

19. The color correction system of claim 13, wherein said color chart recognition module of said color correction unit is further configured to segment said captured destination image content for extracting said second color chart from said captured destination image content.

20. The color correction system of claim 13, wherein said color chart recognition module of said color correction unit is further configured to identify characteristics of said first color chart from said one of said captured destination image content and said combination of said received source image content and said captured destination image content, and characteristics of said second color chart from said captured destination image content for extracting said first color chart and said second color chart respectively.

21. The color correction system of claim 13, wherein said color correction unit further comprises one or more of a graphical user interface and interface elements configured to acquire inputs from a user for one or more of:

highlighting one or more of said extracted first color chart and said extracted second color chart; and adjusting said generated calibration parameters to correct said color distortion of said received source image content of said subject displayed on said display unit at said destination location.

22. The color correction system of claim 13, wherein said modules of said color correction unit further comprise:

one or more input buffer and format converters configured to buffer said received source image content and said captured destination image content, and to convert a format of each of said buffered source image content and said buffered destination image content into a predefined color image format; and an output buffer and format converter configured to convert a format of corrected source image content of said subject with said corrected color distortion into a predefined display format for display on said display unit and to buffer said corrected source image content of said subject.

23. The color correction system of claim 13, wherein said color correction unit is configured to operate in one of an automatic mode, a manual mode, and a semi-manual mode.

24. A computer program product comprising a non-transitory computer readable storage medium, said non-transitory computer readable storage medium storing computer program codes that comprise instructions executable by at least one processor, said computer program codes comprising:

a first computer program code for receiving source image content of a subject and a first color chart from a source image capture device positioned at a source location via a network, wherein said first color chart and said subject are positioned in a field of view of said source image capture device at said source location;

a second computer program code for receiving destination image content of a second color chart and said source image content of said subject and said first color chart displayed on a display unit at a destination location from a destination image capture device, wherein said second color chart is identical to said first color chart and is positioned proximal to said display unit, and wherein said second color chart and said display unit are positioned in a field of view of said destination image capture device at said destination location;

a third computer program code for extracting said first color chart from one of said received destination image content and said combination of said received source image content and said received destination image content;

a fourth computer program code for extracting said second color chart from said received destination image content;

a fifth computer program code for generating calibration parameters by comparing said extracted first color chart and said extracted second color chart; and a sixth computer program code for correcting a color distortion of said received source image content of said subject displayed on said display unit at said destination location using said generated calibration parameters to correct a color of an image of said subject on said display unit at said destination location.

25. The computer program product of claim 24, wherein said computer program codes further comprise:
- a seventh computer program code for rotating and scaling said extracted first color chart and said extracted second color chart;
- an eighth computer program code for comparing color values of corresponding pixels on said rotated and scaled first color chart and said rotated and scaled second color chart to determine differences in said color values, wherein said differences in said color values of said corresponding pixels on said rotated and scaled first color chart and said rotated and scaled second color chart identify said color distortion of said received source image content of said first color chart displayed on said display unit; and
- a ninth computer program code for converting said determined differences in said color values of said corresponding pixels on said rotated and scaled first color chart and said rotated and scaled second color chart to said calibration parameters.

* * * * *